(12) United States Patent
Hiraoka et al.

(10) Patent No.: US 12,093,001 B2
(45) Date of Patent: Sep. 17, 2024

(54) OPERATION RULE DETERMINATION DEVICE, METHOD, AND RECORDING MEDIUM USING FREQUENCY OF A CUMULATIVE REWARD CALCULATED FOR SERIES OF OPERATIONS

(71) Applicant: NEC Corporation, Tokyo (JP)

(72) Inventors: Takuya Hiraoka, Tokyo (JP); Takashi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 17/611,694

(22) PCT Filed: May 22, 2019

(86) PCT No.: PCT/JP2019/020324
§ 371 (c)(1),
(2) Date: Nov. 16, 2021

(87) PCT Pub. No.: WO2020/235061
PCT Pub. Date: Nov. 26, 2020

(65) Prior Publication Data
US 2022/0197230 A1    Jun. 23, 2022

(51) Int. Cl.
*G05B 13/04*    (2006.01)
*G05B 15/02*    (2006.01)
*G08B 31/00*    (2006.01)

(52) U.S. Cl.
CPC ............. *G05B 15/02* (2013.01); *G08B 31/00* (2013.01)

(58) Field of Classification Search
CPC .................................................... G05B 13/042
See application file for complete search history.

(56) References Cited

U.S. PATENT DOCUMENTS

| | | | |
|---|---|---|---|
| 2012/0253514 A1* | 10/2012 | Sugimoto | G05B 13/0265 700/250 |
| 2018/0222046 A1* | 8/2018 | Gotou | B25J 9/1612 |
| 2019/0018374 A1 | 1/2019 | Kanokogi et al. | |
| 2020/0103883 A1 | 4/2020 | Kishi et al. | |
| 2020/0285204 A1* | 9/2020 | Iwane | G06N 20/00 |

FOREIGN PATENT DOCUMENTS

| | | | |
|---|---|---|---|
| CN | 106101379 A | * 11/2016 | ........ H04M 1/72563 |
| JP | 2011-014038 A | 1/2011 | |
| JP | 2013-225192 A | 10/2013 | |

(Continued)

OTHER PUBLICATIONS

International Search Report for PCT Application No. PCT/JP2019/020324, mailed on Aug. 27, 2019.

*Primary Examiner* — Suresh Suryawanshi

(57) ABSTRACT

An operation rule determination device includes an environment execution unit that obtains a state of a control target after each operation and the degree associated with the state for a series of operations on the control target, by using degree information in which the state and the degree of desirability of the state are associated with each other, and a risk-considered history generation unit that calculates a cumulative degree obtained by accumulating the obtained degree for the series of operations, and, when the cumulative degree satisfies a condition, reduces the degree associated with the state after the series of operations in the degree information.

7 Claims, 8 Drawing Sheets

(56) References Cited

FOREIGN PATENT DOCUMENTS

| | | | |
|---|---|---|---|
| JP | 2018-165693 A | 10/2018 | |
| JP | 2019-020885 A | 2/2019 | |
| KR | 20180096113 A * | 8/2018 | |
| WO | 2018/181020 A1 | 10/2018 | |
| WO | WO-2019012740 A1 * | 1/2019 | ........... G05B 13/042 |

* cited by examiner

FIG. 9

| m | t | $a_{t,m}$ | $s_{t,m}$ | $r_{t,m}$ |
|---|---|---|---|---|
| 1 | 1 | 0.1 | (-0.3, 1.0) | 0 |
| 1 | 2 | 0.2 | (0.1, 1.5) | 5 |
| 1 | 3 | 0.1 | (0.7, 1.3) | 3 |
| 2 | 1 | 0.2 | (-0.3, 1.0) | 0 |
| 2 | 2 | 0.1 | (-0.35, 0.1) | -10 |

FIG. 10

| m | t | $a_{t,m}$ | $s'_{t,m}$ | $r'_{t,m}$ |
|---|---|---|---|---|
| 1 | 1 | 0.1 | (-0.3, 1.0, -1, 0) | 0 |
| 1 | 2 | 0.2 | (0.1, 1.5, -1, 0) | 5 |
| 1 | 3 | 0.1 | (0.7, 1.3, -1, -5) | 3-(1/0.1 * max(0, -0-5-3+1)) |
| 2 | 1 | 0.2 | (-0.3, 1.0, -1, 0) | 0 |
| 2 | 2 | 0.1 | (-0.35, 0.1, -1, 0) | -10-(1/0.1 * max(0, -0+10+1)) |

OPERATION RULE DETERMINATION DEVICE, METHOD, AND RECORDING MEDIUM USING FREQUENCY OF A CUMULATIVE REWARD CALCULATED FOR SERIES OF OPERATIONS

This application is a National Stage Entry of PCT/JP2019/020324 filed on May 22, 2019, the contents of all of which are incorporated herein by reference, in their entirety.

TECHNICAL FIELD

The present invention relates to an operation rule determination device, an operation rule determination method, and a recording medium.

BACKGROUND ART

Regarding learning about risk, Patent Document 1 discloses an online risk learning system that learns and recognizes risks included in an external environment of a moving object such as an automobile. Such an online risk learning system adaptively learns the degree of danger of a state of an external environment by using training information which is created by using information indicating the state of the external environment and risk information regarding the degree of danger of the state, and recognizes the degree of danger included in the external environment.

PRIOR ART DOCUMENTS

Patent Literature

[Patent Document 1] Japanese Unexamined Patent Application, First Publication No. 2011-14038

SUMMARY OF THE INVENTION

Problem to be Solved by the Invention

In the case of reinforcement learning, it is preferable that a planner which determines an operation according to the state can determine an operation considering a risk. On the other hand, Patent Document 1 does not disclose a method of determining an operation considering the risk in reinforcement learning.

An example of an object of the present invention is to provide an operation rule determination device, an operation rule determination method, and a recording medium capable of solving the above problems.

Means for Solving the Problem

According to a first example aspect of the present invention, an operation rule determination device includes an environment execution unit that obtains a state of a control target after each operation and a degree associated with the state for a series of operations on the control target, by using degree information in which the state and a degree of desirability of the state are associated with each other, and a risk-considered history generation unit that calculates a cumulative degree obtained by accumulating the obtained degree for the series of operations, and, when the cumulative degree satisfies a condition, reduces the degree associated with the state after the series of operations in the degree information.

According to a second example aspect of the present invention, an operation rule determination method includes a step of, by a computer, obtaining a state of a control target after each operation and a degree associated with the state for a series of operations on the control target, by using degree information in which the state and the degree of desirability of the state are associated with each other, and a step of, by the computer, calculating a cumulative degree obtained by accumulating the obtained degree for the series of operations, and, when the cumulative degree satisfies a condition, reducing the degree associated with the state after the series of operations in the degree information.

According to a third example aspect of the present invention, a recording medium storing a program causing a computer to execute a process including obtaining a state of a control target after each operation and a degree associated with the state for a series of operations on the control target, by using degree information in which the state and the degree of desirability of the state are associated with each other, and calculating the cumulative degree obtained by accumulating the obtained degree for the series of operations, and, when the cumulative degree satisfies a condition, reducing the degree associated with the state after the series of operations in the degree information.

Effect of the Invention

According to the operation rule determination device, the operation rule determination method, and the recording medium described above, in reinforcement learning, a planner which determines an operation according to a state can determine an operation considering a risk.

BRIEF DESCRIPTION OF THE DRAWINGS

FIG. 9 is a diagram showing an example of interaction history information according to the second example embodiment.

FIG. 10 is a diagram showing an example of risk-considered interaction history information according to the second example embodiment.

EXAMPLE EMBODIMENT

Hereinafter, example embodiments of the present invention will be described, but the following example embodiments do not limit the inventions claimed. Also, not all combinations of features described in the example embodiments are essential to the means of solving the invention.

First Example Embodiment

Figure 1:
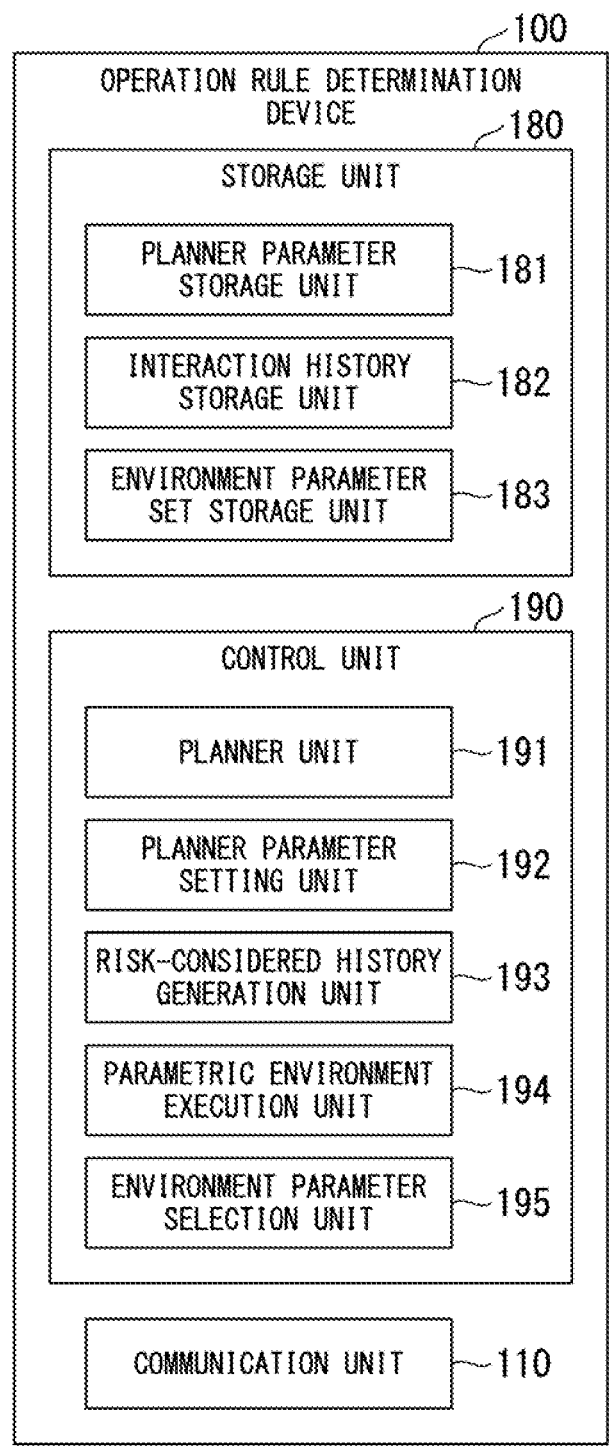
FIG. 1 is a schematic block diagram showing an example of a functional configuration of an operation rule determination device according to a first example embodiment.

FIG. 1 is a schematic block diagram showing an example of a functional configuration of an operation rule determination device according to a first example embodiment. In the configuration represented in FIG. 1, an operation rule determination device 100 includes a communication unit 110, a storage unit 180, and a control unit 190. The storage unit 180 includes a planner parameter storage unit 181, an interaction history storage unit 182, and an environment parameter set storage unit 183. The control unit 190 includes a planner unit 191, a planner parameter setting unit 192, a risk-considered history generation unit 193, a parametric environment execution unit 194, and an environment parameter selection unit 195.

The operation rule determination device 100 determines an operation (control, action) rule of a control target by reinforcement learning. The operation rule determination device 100 may control the control target in accordance with the determined rule. Reinforcement learning here means machine learning of learning an operation rule for determining an operation of a control target in a certain environment, based on the operation of the control target, an environment and an observed state of the control target, and a reward showing the degree of desirability of the state of the control target. The degree of desirability of the state of the control target here means the degree showing how desirable the state is.

The degree of desirability of the state of the control target is given to the operation rule determination device 100, for example, by degree information showing the degree. In other words, the degree information is information in which the state of the control target and the degree of desirability of the state are associated with each other. The degree of desirability is referred to as a "reward" below.

The control target of the operation rule determination device 100 is not limited to a specific one. The control target may be, for example, a moving object such as an automobile, an airplane, or a ship, a processing factory, or a manufacturing process. As the control target of the operation rule determination device 100, it is assumed that reinforcement learning can be performed on the operation of a control target, and the control target can be caused to perform an operation determined based on the reinforcement learning.

Here, the surrounding environment of a control target is also simply referred to as an environment. The environment here means an environment in reinforcement learning. The environment may influence a control target, for example, the environment may influence the operation of the control target. The environment may change depending on the operation of the control target. For example, the environment changes by the control target moving from one place to another place.

Information that can be obtained from the environment or the control target is referred to as a state. The state here means a state in reinforcement learning. A value measured by a sensor and the position of the control target are exemplary examples of the state, but the invention is not limited to such exemplary examples.

The operation rule here means a rule for determining the operation of the control target in accordance with the state.

An operation obtained by applying the state to the operation rule is also referred to as an operation plan or simply to as a plan. A process of obtaining an operation is referred to as planning. The subject which performs planning is referred to as a planner.

The operation rule determination device 100 stores the operation rule including a parameter in advance, and determines the operation rule by determining the value of the parameter. Thus, the operation rule determination device 100 may control the control target in accordance with the determined parameter value. The parameter included in the operation rule is referred to as a planner parameter.

The operation rule determination device 100 calculates information regarding the environment by simulation. The simulation is also referred to as an environment simulation or simply to as a simulation.

A model used by the operation rule determination device 100 for the simulation includes a parameter other than the state. Such a parameter is referred to as an environment parameter. The value of the environment parameter may influence the control target.

The static frictional coefficient, the dynamic frictional coefficient, and the temperature of a place in which a temperature sensor is not provided are exemplary examples of the environment parameter, but the invention is not limited to such exemplary examples. When the control target moves on a floor, the static frictional coefficient and the dynamic frictional coefficient are information that can be acquired, for example, by the control target actually moving on the floor.

The set of values that may be taken by the environment parameter is referred to as an environment parameter set. The environment parameter set is given stochastically, for example, given by probability distribution. Specifically, the environment parameter set shows values that may be taken by the environment parameter and the probabilities that the environment parameter can take the values. The environment parameter is not limited to one type of parameter, and may be a plurality of types of parameters.

The environment parameter set is given to the operation rule determination device 100 in advance, for example, the environment parameter is set by a user of the operation rule determination device 100.

The operation rule determination device 100 performs sampling of the value of the environment parameter shown by the environment parameter set, in accordance with the probability shown by the environment parameter set. The operation rule determination device sets the value obtained by the sampling, in the environment parameter of a simulation model, and then performs simulation of an operation of the control target and the like in accordance with the set environment parameter. The operation rule determination device 100 acquires, for example, the state of the control target after the operation by the simulation.

The operation rule determination device 100 specifies the state of the control target after the operation, and determines the reward according to the specified state by using the degree information. The operation rule determination device 100 calculates the reward obtained by the operation based on the determined reward. The operation rule determination device 100 obtains the degree associated with the state by using the degree information, for example.

The operation is not limited to an operation at one timing, and may be an operation at each of a plurality of timings. A process of determining the reward according to the state may be, for example, not only a process of determining the reward based on the given degree information in which the state and the reward in this state are associated with each other, but also a process based on the reward determined by the operation rule determination device 100 as described later. A method of calculating the reward obtained by the operation may be not only a method of calculating the total value of the reward at every timing, but also a method of multiplying the reward by weight that becomes smaller toward the future timing and summing the obtained values.

A method of calculating the reward may be given to the operation rule determination device 100 in advance, for example, given by the user of the operation rule determination device 100. The method of calculating the reward may be given to the operation rule determination device 100 in a form of a mathematical expression, but the method is not limited thereto. The operation rule determination device 100 calculate the reward by applying the state and the operation to the method of calculating the reward.

History information of a combination of the operation, the state, and the reward is referred to as interaction history information. The operation rule determination device 100 generates the interaction history information. The interaction history information means history information in which the operation determined in accordance with the state based on the operation rule, the state calculated in accordance with the operation by simulation, and the reward calculated in accordance with the operation and the state are combined.

A combination of one process of determining the operation based on the operation rule and one process of calculating the state by simulation is referred to as one turn. That is, one turn represents a process of determining the operation of the control target at one timing and the state of the control target after the operation.

The repetition of the turn from the initial state until a predetermined end condition is established is referred to as one episode. That is, the episode can represent a series of operations on the control target.

The operation rule determination device 100 generates risk-considered history information based on the interaction history information. The risk-considered history information is information obtained by applying the risk indicated by the interaction history information to the reward.

The operation rule determination device 100 may perform reinforcement learning by using a penalty instead of the reward. The reward may be expressed by a positive value, for example, when the state of the control target is in a desired state (or approaches the desired state). The penalty may be expressed by a negative value when the state of the control target is not in the desired state (or is away from the desired state). In this case, the reward and the penalty can be expressed using the positive value and the negative value. In the following description, the reward and the penalty may be collectively referred to as the "reward".

The communication unit 110 communicates with another device. For example, the communication unit 110 receives information indicating the state from a sensor or the like during an actual operation of the operation rule determination device 100.

The actual operation of the operation rule determination device 100 is to calculate the operation of the control target based on the operation rule obtained by reinforcement learning, after the reinforcement learning has been completed. The operation rule determination device 100 may directly control the operation of the control target. Alternatively, when there is a person in charge of controlling the control target such as a plant operator, the operation rule determination device 100 may propose the calculated operation to the person in charge of the control. Alternatively, when the plant is automatically controlled, the operation rule determination device 100 may instruct the control device controlling the plant to operate the control target.

The storage unit 180 stores various types of information. The storage unit 180 is configured by using a storage device in the operation rule determination device 100.

The planner parameter storage unit 181 stores the planner parameters.

The interaction history storage unit 182 stores the interaction history information.

The environment parameter set storage unit 183 stores the environment parameter set.

The control unit 190 controls the units of the operation rule determination device 100 to execute various processes. A CPU (Central Processing Unit) in the operation rule determination device 100 reads a program from the storage unit 180 and executes the program to perform the function of the control unit 190.

The planner unit 191 performs planning. That is, the planner unit 191 determines the operation by applying the state to the operation rule for determining the operation of the control target in accordance with the state.

The risk-considered history generation unit 193 generates risk-considered interaction history information based on the interaction history information.

The planner parameter setting unit 192 determines the value of the planner parameter based on the risk-considered history information.

The parametric environment execution unit 194 executes the simulation described above.

The environment parameter selection unit 195 performs sampling of the values of the environment parameters from the environment parameter set in accordance with the probabilities shown in the environment parameter set.

The parametric environment execution unit 194 corresponds to an example of an environment execution unit.

Figure 2:
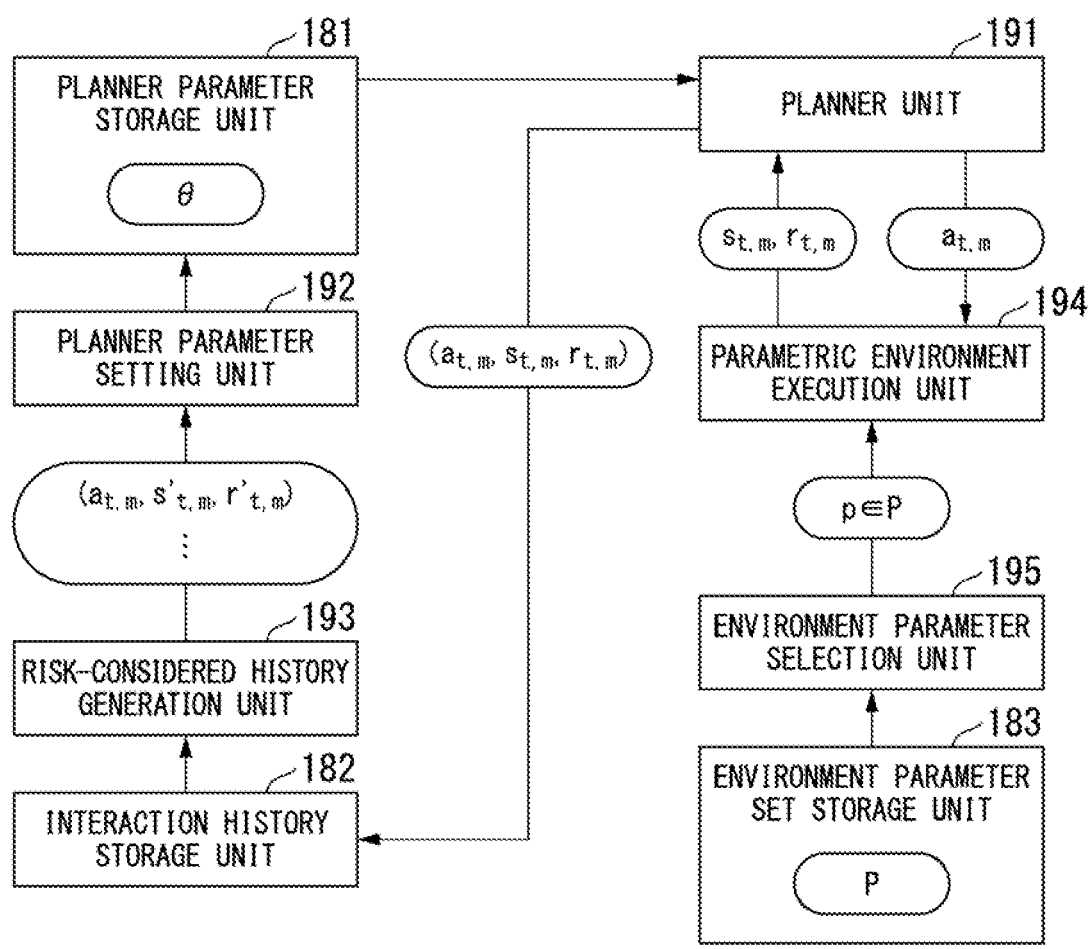
FIG. 2 is a diagram showing an example of a data flow in the operation rule determination device according to the first example embodiment.

FIG. 2 is a diagram showing an example of a data flow in the operation rule determination device 100.

In the example in FIG. 2, the environment parameter set storage unit 183 stores an environment parameter set P. The environment parameter set P shows the probability distribution of values that may be taken by an environment parameter p. That is, the environment parameter set P shows a value that may be taken by the environment parameter p and a probability that the environment parameter p may take the value.

The environment parameter set P is stored in advance by the environment parameter set storage unit 183, for example, in a manner of being given by the user of the operation rule determination device 100.

The environment parameter selection unit 195 performs sampling of the values of the environment parameter p from the environment parameter set P in accordance with the probabilities shown in the environment parameter set P. The environment parameter selection unit 195 outputs the obtained value to the parametric environment execution unit 194.

The parametric environment execution unit 194 simulates the environment. The parametric environment execution unit 194 simulates the operation of the control target and the like by applying the value of the environment parameter p sampled by the environment parameter selection unit 195 to the simulation model. The environment parameter selection unit 195 calculates a state $s_{t,\,m}$ for an operation $a_{t,\,m}$ output by the planner unit 191 and a reward $r_{t,\,m}$ based on the operation $a_{t,\,m}$ and the state $s_{t,\,m}$ in the simulation. m is an identifier showing one episode. t is an identifier showing one timing. "t, m" is an identifier for showing the t-th timing of the m-th episode.

The planner unit 191 determines the operation according to the state based on the operation rule. In the first turn in an episode, the planner unit 191 determines an operation according to the initial state. The initial state here means the initial value of the state. The user of the operation rule determination device 100 may give the initial state. Alternatively, the planner unit 191 may automatically set the initial state. In the second turn of one episode and after that, the planner unit 191 determines the operation according to the state calculated by the parametric environment execution unit 194 in the simulation of the previous turn.

The planner unit 191 generates interaction history information for each episode, in which combinations of the operations $a_{t,\,m}$, the states $s_{t,\,m}$, and the rewards $r_{t,\,m}$ in one turn are collected for one episode. The planner unit 191 stores the interaction history information of each episode in the interaction history storage unit 182. That is, the planner unit 191 obtains the state of the control target after each operation and the degree associated with the state for a series of operations on the control target, by using degree information in which the state and the degree of desirability of the state are associated with each other. The planner unit 191 generates interaction history information in which the obtained state and the degree related to the obtained state are combined, and stores the generated interaction history information in the interaction history storage unit 182.

The risk-considered history generation unit 193 generates risk-considered history information according to the interaction history information. Specifically, the risk-considered history generation unit 193 reads the interaction history information from the interaction history storage unit 182, and applies the risk in the read interaction history information.

The risk-considered history generation unit 193 reads, for example, the degree of desirability of the state in one episode from the interaction history storage unit 182, and calculates the cumulative degree showing the degree obtained by accumulating the read degree. When the cumulative degree satisfies a condition, the risk-considered history generation unit 193 reduces the degree associated with the state after a series of operations in the degree information. When the cumulative degree satisfies the condition, the risk-considered history generation unit 193 reduces the degree (reward) of desirability of the state in the interaction history information showing the state after a series of operations. With such a process, the risk-considered history generation unit 193 applies the risk in the read interaction history information.

The condition here may be shown by, for example, the value of the reward (degree of desirability of the state) being equal to or less than a predetermined threshold value, but the invention is not limited thereto. The risk-considered history generation unit 193 may apply the risk in the interaction history information by, for example, subtracting an amount (risk portion) according to the cumulative degree from the reward of the episode including the risk, but the invention is not limited thereto. The risk-considered history generation unit 193 may execute a process of subtracting an amount (risk portion) according to the cumulative degree of the episode from the degree showing the final state of the episode in the degree information.

The risk-considered history generation unit 193 outputs the generated risk-considered history information to the planner parameter setting unit 192.

The planner parameter setting unit 192 determines the value of the planner parameter θ based on the risk-considered history information. The planner parameter setting unit 192 determines the value of the planner parameter θ so as to maximize the reward, for example, to maximize the total reward (for example, the sum of the rewards in all turns of all episodes). The planner parameter setting unit 192 may update the planner parameter θ so that the cumulative degree increases, for example.

Next, the operation of the operation rule determination device 100 will be described with reference to FIG. 3.

Figure 3:
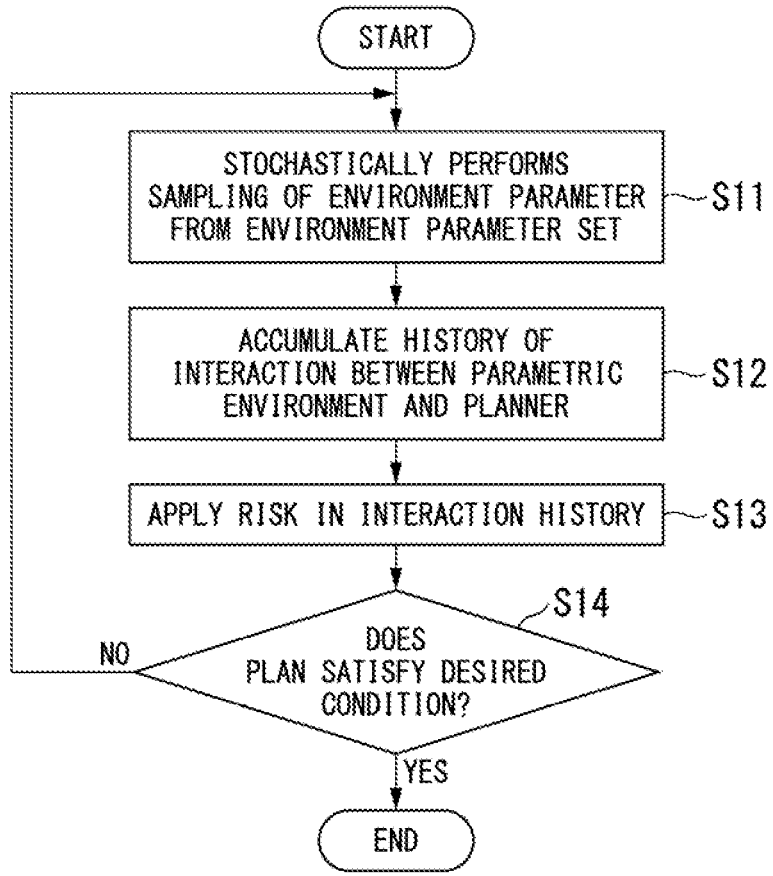
FIG. 3 is a flowchart showing an example of a process procedure in which the operation rule determination device according to the first example embodiment determines a plan.

FIG. 3 is a flowchart showing an example of a process procedure in which the operation rule determination device 100 determines a plan.

In the process in FIG. 3, the environment parameter selection unit 195 stochastically performs sampling of the environment parameter from the environment parameter set stored in the environment parameter set storage unit 183 (Step S11). The environment parameter selection unit 195 transmits the sampled environment parameter to the parametric environment execution unit 194.

Then, the planner unit 191 and the parametric environment execution unit 194 interact with each other to accumulate the history of the interaction in the interaction history storage unit 182 (Step S12).

Specifically, the planner unit 191 determines the operation of a control target, and the parametric environment execution unit 194 calculates the state for the operation in the environment according to the environment parameter. The parametric environment execution unit 194 may calculate the state of the control target after the operation by, for example, simulating the operation of the control target in accordance with the parameter value. The parametric environment execution unit 194 calculates a reward based on the obtained state.

The planner unit 191 determines the operation of the control target in accordance with the state calculated by the parametric environment execution unit 194. As described above, the planner unit 191 and the parametric environment execution unit 194 repeat the determination of the operation, the calculation of the state, and the calculation of the reward until a predetermined end condition is established.

The planner unit 191 stores the history of the combination of the operation, the state, and the reward in the interaction history storage unit 182 as the interaction history information.

Then, the risk-considered history generation unit 193 reads a risk from the interaction history information stored in the interaction history storage unit 182, and applies the risk in the interaction history information (Step S13).

The operation rule determination device 100 determines whether or not the predetermined end condition is established (Step S14). The end condition here is not limited to a specific one as long as it can be determined whether the reinforcement learning is ended by adopting the obtained plan. For example, as the end condition here, whether the parameter is converged, whether the application of the risk to the plan satisfies a predetermined condition, or whether the interaction between the planner unit 191 and the parametric environment execution unit 194 is performed a predetermined number of repetitions can be provided. Alternatively, a combination thereof can be used, but the invention is not limited thereto.

When the operation rule determination device 100 determines that the end condition is not established (Step S14: NO), the process returns to Step S11. When it is determined that the end condition is established (Step S14: YES), the operation rule determination device 100 ends the process in FIG. 3.

As described above, the parametric environment execution unit 194 uses the degree information in which the state of the control target and the degree of desirability of the state are associated with each other, to obtain the state after each operation and the degree associated with that state for a series of operations on the control target. The risk-considered history generation unit 193 calculates the cumulative degree obtained by accumulating the obtained degree for the series of operations. When the cumulative degree satisfies a condition, the risk-considered history generation unit reduces the degree associated with the state after the series of operations in the degree information.

According to the operation rule determination device 100, the operation rule considering the risk can be obtained by determining the operation rule by using the risk-considered interaction history information in which the risk is applied. Thus, the planner which determines the operation according to the state can determine the operation considering the risk.

The planner parameter setting unit 192 updates the parameter value indicating the operation of the control target so that the cumulative degree increases.

Thus, the operation rule considering the risk can be obtained. Thus, in the operation rule determination device 100, as described above, the planner which determines the operation according to the state can determine the operation considering the risk.

The risk-considered history generation unit 193 calculates the above-described cumulative degree for each of a plurality of series of operations, obtains the frequency of the calculated cumulative degree, and determines a condition (reward) by using the obtained frequency.

The planner parameter setting unit 192 can obtain the operation rule considering the risk by setting the value of the planner parameter based on the condition determined by the risk-considered history generation unit 193.

The planner unit 191 controls the control target in accordance with the parameter value set by the planner parameter setting unit 192.

Thus, the planner unit 191 can control the control target in consideration of the risk.

The parametric environment execution unit 194 simulates the operation of the control target based on the parameter value set by the planner parameter setting unit 192.

Thus, the parametric environment execution unit 194 can calculate the result of the control on the control target in consideration of the risk.

The risk-considered history generation unit 193 reduces the amount according to the cumulative degree from the degree in the degree information.

Thus, the risk-considered history generation unit 193 can generate interaction history information in which the risk is applied. The planner parameter setting unit 192 sets the value of the planner parameter by using the interaction history information in which the risk is applied, so that an operation rule considering the risk can be obtained.

The risk-considered history generation unit 193 generates risk-considered interaction history information obtained by applying the risk detected from the interaction history information being history information of a combination of the operation of the control target, the observed state of the control target or the environment, and the reward according to the environment, to the interaction history information. The planner parameter setting unit 192 determines the value of the planner parameter, being the parameter of the operation rule for determining the operation to be performed on the control target in accordance with the state, based on the risk-considered interaction history information. The planner unit 191 determines the operation of the control target by using the operation rule in which the value of the planner parameter determined by the planner parameter setting unit 192 is set. The planner unit 191 may control the operation of the control target in accordance with the value of the planner parameter.

According to the operation rule determination device 100, the operation rule considering the risk can be obtained by setting the parameter value of the operation rule by using the risk-considered interaction history information in which the risk is applied. Thus, the planner which determines the operation according to the state can determine the operation considering the risk.

The environment parameter selection unit 195 selects the value of the environment parameter being the parameter included in a simulation model of the environment, from the value that may be taken by the environment parameter and the environment parameter set showing the probability distribution of the value, based on the probability distribution. The parametric environment execution unit 194 simulates the environment by using the simulation model in which the value of the environment parameter selected by the environment parameter selection unit 195 is set, and calculates information indicating the state.

According to the operation rule determination device 100, it is possible to apply the risk in the environment in which a movement differs depending on the value of the environment parameter, to the operation rule.

When a condition that the value of the reward indicated by the interaction history information is less than a predetermined value is satisfied, the risk-considered history generation unit 193 generates risk-considered interaction history information by reducing the value of the reward indicated by the interaction history information. As described above, the risk-considered history generation unit 193 may learn the operation rule based on the reward in a manner that the risk-considered history generation unit applies the risk shown by the value of the reward being less than the predetermined value.

The risk-considered history generation unit 193 may obtain the frequency of the cumulative degree for a plurality of episodes and determine the predetermined value by using the obtained frequency. The risk-considered history generation unit 193 may determine the predetermined value at the quantile point (for example, 1 percentile, 5 percentile, 10 percentile) of the frequency distribution.

Second Example Embodiment

In a second example embodiment, a more specific application example of the operation rule determination device 100 according to the first example embodiment will be described. The description of the first example embodiment is also applied to the second example embodiment. In particular, the configuration and operation of an operation rule determination device 100 in the second example embodiment are similar to the configuration and operation described with reference to FIGS. 1 to 3.

In the second example embodiment, an example in which the operation rule determination device 100 plans the control of a robot called Hopper will be described. In this example, the operation rule determination device 100 plans a series of torque values applied to the Hopper in order to move Hopper forward quickly without tipping over.

In the second example embodiment, as a state, information represented by two-dimensional coordinates is used as position information of Hopper. Further, for an operation, the numerical value of the torque for controlling the operation of Hopper is used. Regarding the environment, it is assumed that the parametric environment execution unit 194 simulates the operation of Hopper by a physics simulator. The frictional coefficient of the ground in the simulation is used as an environment parameter. The reward is assumed to be given in accordance with the progress of Hopper in the forward direction.

Figure 4:
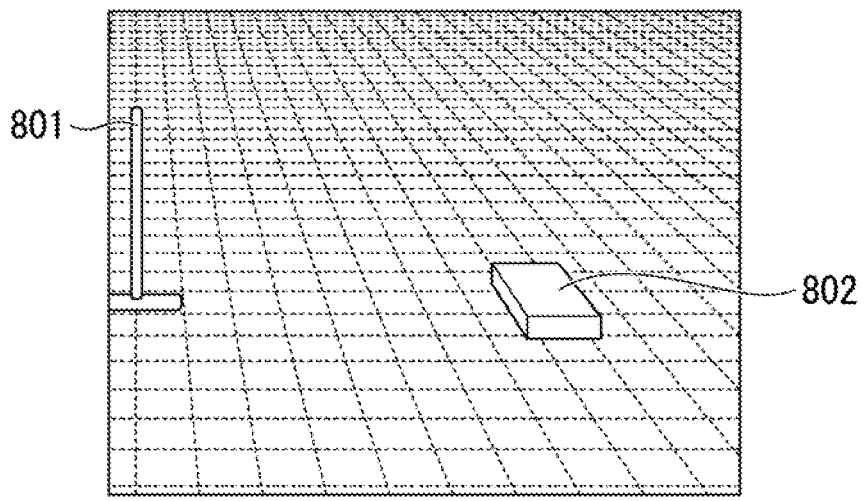
FIG. 4 is a diagram showing an example of a first turn of a first episode according to a second example embodiment.
Figure 5:
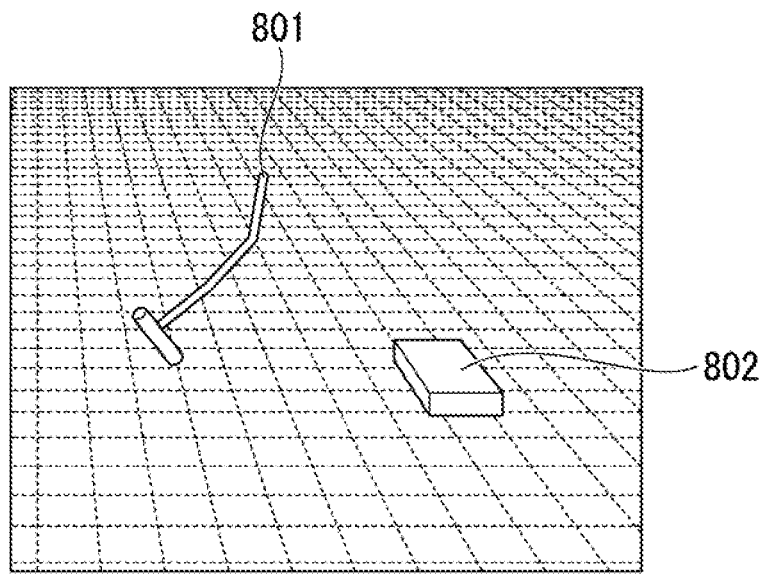
FIG. 5 is a diagram showing an example of a second turn of the first episode according to the second example embodiment.
Figure 6:
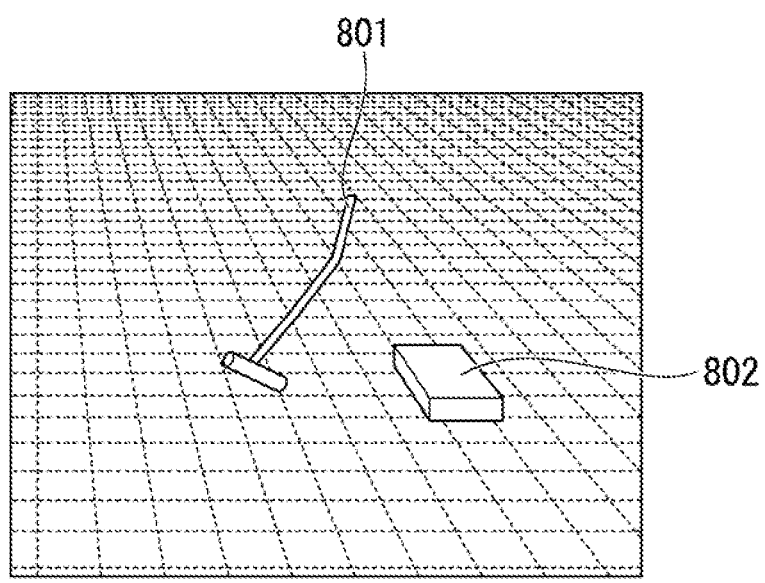
FIG. 6 is a diagram showing an example of a third turn of the first episode according to the second example embodiment.
Figure 7:
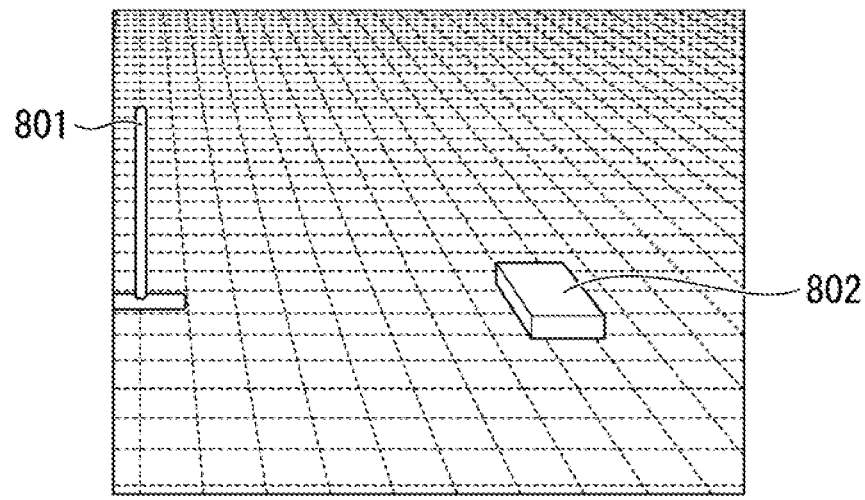
FIG. 7 is a diagram showing an example of a first turn of a second episode according to the second example embodiment.
Figure 8:
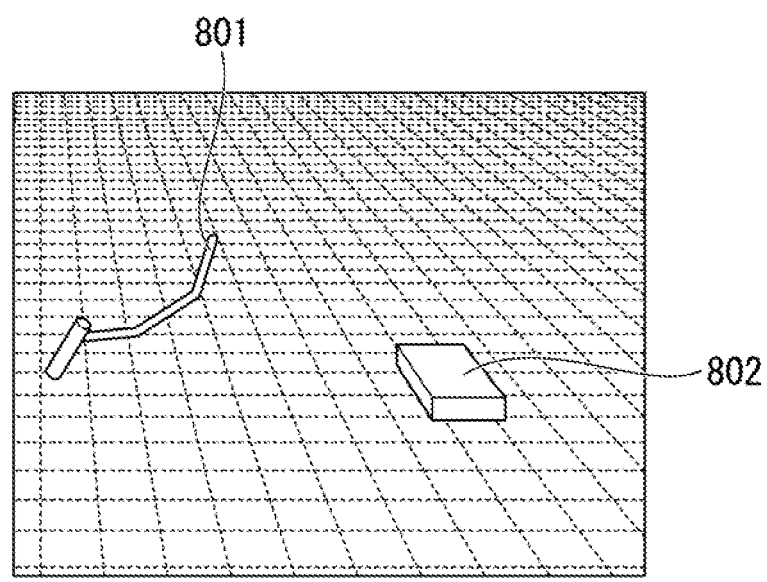
FIG. 8 is a diagram showing an example of a second turn of the second episode according to the second example embodiment.

Examples of two episodes will be described with reference to FIGS. 4 to 8. FIGS. 4 to 6 represent a first episode, and FIGS. 7 and 8 represent a second episode.

In the second example embodiment, in Step S11 in FIG. 3, the environment parameter selection unit 195 acquires information of {Prob(frictional coefficient between Hopper and the ground=2.0)=0.9, Prob(frictional coefficient between Hopper and the ground=0.1)=0.1} from the environment parameter set storage unit 183 as an environment parameter set. The frictional coefficient between Hopper and the ground is also simply referred to as the frictional coefficient.

Prob indicates the probability that the environment parameter takes the value shown in parentheses. Thus, the environment parameter selection unit 195 acquires information that "the frictional coefficient is 2.0 with a probability of 0.9 and 0.1 with a probability of 0.1".

The environment parameter selection unit 195 selects the environment parameter value in accordance with the probability shown in the obtained environment parameter set.

In the example in the second example embodiment, it is assumed that the environment parameter selection unit 195 sets the environment parameter value for each episode. It is assumed that the environment parameter selection unit 195 selects "the frictional coefficient=2.0" for the first episode and "the frictional coefficient=0.1" for the second episode.

In Step S12 in FIG. 3, the planner unit 191 and the parametric environment execution unit 194 interact with each other to accumulate the interaction history information in the interaction history storage unit 182. The interaction history information here means the history of a combination of the position information of Hopper in the two-dimensional coordinates, the numerical value of the torque for operating the Hopper, and the reward.

In the example in the second example embodiment, it is assumed that the maximum number of turns is set to three, and the planner unit 191 and the parametric environment execution unit 194 repeat the interaction until the number of turns reaches the maximum value or Hopper falls, for each episode.

FIG. 4 is a diagram showing an example of a first turn of the first episode. Thus, FIG. 4 represents the initial state in the first episode. FIGS. 4 to 8 represent Hopper 801 and a target position 802. The target position 802 is disposed at a position of the progress target of Hopper 801. In the example in the second example embodiment, the target position 802 is fixed. Thus, the target position 802 is located at the same position in any turn of any episode.

FIG. 5 is a diagram showing an example of a second turn of the first episode. In the example in FIG. 5, Hopper 801 is closer to the target position 802 than in the case of the first turn represented in FIG. 4.

FIG. 6 is a diagram showing an example of a third turn of the first episode. In the example in FIG. 6, Hopper 801 is closer to the target position 802 than in the case of the second turn represented in FIG. 5. In the first episode, the maximum number of turns of 3 is reached in the example in FIG. 6, and thus the interaction between the planner unit 191 and the parametric environment execution unit 194 is ended. The planner unit 191 stores history of a combination of the position information of Hopper 801 in the two-dimensional coordinates from the first turn to the third turn in the first episode, the numerical value of the torque for operating Hopper 801, and the reward, in the interaction history storage unit 182 as the interaction history information.

FIG. 7 is a diagram showing an example of a first turn of the second episode. Thus, FIG. 7 represents the initial state in the second episode.

FIG. 8 is a diagram showing an example of a second turn of the second episode. In the example in FIG. 8, Hopper 801 has fallen. Therefore, the interaction between the planner unit 191 and the parametric environment execution unit 194 is ended. The planner unit 191 stores history of a combination of the position information of Hopper 801 in the two-dimensional coordinates from the first turn to the second turn in the second episode, the numerical value of the torque for controlling the operation of Hopper 801, and the reward, in the interaction history storage unit 182 as the interaction history information.

FIG. 9 is a diagram showing an example of the interaction history information. In the example in FIG. 9, the interaction history information is shown in a tabular form, with one row showing information of the interaction in one turn.

In FIG. 9, m indicates the identification number of the episode. t indicates the identification number of the turn. The operation $a_{t,\,m}$ indicates the numerical value of the torque for controlling the operation of Hopper 801 in the t-turn of the m-th episode. The state $s_{t,\,m}$ indicates the coordinates (position information) of Hopper 801 in the t-turn of the m-th episode.

The reward $r_{t,\,m}$ indicates the reward in the t-turn of the m-th episode.

In both the first turn of the first episode and the first turn of the second episode, the reward is 0 because of the initial state in the episode. In both the second and third turns of the first episode, the reward is given in accordance with the progress of Hopper 801 toward the target position 802. On the other hand, in the second turn of the second episode, Hopper 801 has fallen. Thus, a reward of −10 is given.

In Step S13 in FIG. 3, the risk-considered history generation unit 193 generates risk-considered interaction history information by applying the risk in the interaction history information.

FIG. 10 is a diagram showing an example of the risk-considered interaction history information. In the example in FIG. 10, the risk-considered history generation unit 193 generates risk-considered interaction history information in which the state $s_{t,\,m}$ of the interaction history information in FIG. 9 is replaced with risk-considered state information $s'_{t,m}$, and the reward $r_{t,m}$ is replaced with a risk-considered reward $r'_{t,m}$.

The risk-considered history generation unit 193 generates the risk-considered state information $s'_{t,m}$ based on Expression (1).

$$s'_{t,m} := s_{t,m} \| \left( v, \sum_{t=0}^{T_m-1} -r_{t,m} \right) \quad (1)$$

Here, "‖" indicates an arithmetic operation for combining the elements of the vector. That is, while the state $s_{t,m}$ is represented as $(x_{t,m}, y_{t,m})$, the risk-considered state information $s'_{t,m}$ is $(x_{t,m}, y_{t,m}, v, \Sigma_{t=0}^{Tm-1} -r_{t,m})$.

However, $x_{t,m}$ indicates the x-coordinate of the position of Hopper 801 in the t-turn of the m-th episode. $y_{t,m}$ indicates the y-coordinate of the position of Hopper 801 in the t-turn of the m-th episode. That is, the vector $(x_{t,m}, y_{t,m})$ corresponds to an example of the position information of Hopper 801 in the two-dimensional coordinates in the t-turn of the m-th episode.

v indicates a threshold value for evaluating the risk based on the reward. $T_m$ indicates the number of turns in the m-th episode. In the example in the second example embodiment, $T_1=3$ and $T_2=2$.

"$\Sigma_{t=0}^{Tm-1} -r_{t,m}$" represents a value obtained by multiplying the total value of the rewards from the timing "0" to the timing "$T_{m-1}$" in the m-th episode by "-1". That is, "$\Sigma_{t=0}^{Tm-1} -r_{t,m}$" can be the total value of the penalties from the timing "0" to the timing "$T_{m-1}$" in the m-th episode.

v and $\Sigma_{t=0}^{Tm-1} -r_{t,m}$ of the risk-considered state information $s'_{t,m}$ are used to calculate the risk-considered reward $r'_{t,m}$. It is not essential that this information is included in the risk-considered state information $s'_{t,m}$. For example, the storage unit 180 may store the threshold value v separately from the risk-considered state information m. If the risk-considered history generation unit 193 uses the history of the state indicated by the interaction history information when calculating the risk-considered reward $r_{t,m}$, it is not necessary to include "$\Sigma_{t=0}^{Tm-1} -r_{t,m}$" in the risk-considered state information $s'_{t,m}$.

The risk-considered history generation unit 193 generates the risk-considered reward $r'_{t,m}$ based on Expression (2).

$$r'_{t,m} = \begin{cases} r_{t,m} & \text{(CASE EXCEPT FOR FINAL PATTERN)} \\ r_{t,m} - \frac{1}{\varepsilon}\max\left(0, v + \sum_{t=0}^{T_m} -r_{t,m}\right) & \text{(CASE OF FINAL PATTERN)} \end{cases} \quad (2)$$

Here, $(1/\varepsilon)\max(0, v+\Sigma_{t=0}^{Tm} -r_{t,m})$ in Expression (2) represents the penalty, and is a coefficient for determining how important the penalty is. For convenience of description, c is set to a real constant.

Since "–" is added to the reward $r_{t,m}$ in Expression (2), the smaller the total of the reward $r_{t,m}$ in the m-th episode, the larger the value of $\Sigma_{t=0}^{Tm} -r_{t,m}$. When the value of $\Sigma_{t=0}^{Tm} -r_{t,m}$ is equal to or less than $-v$, 0 is selected by the max function of Expression (2), and the penalty $(1/\varepsilon)\max(0, v+\Sigma_{t=0}^{Tm} -r_{t,m})$ is 0. On the other hand, when the value of $\Sigma_{t=0}^{Tm} -r_{t,m}$ is more than $-v$, $v+\Sigma_{t=0}^{Tm} -r_{t,m}$ is selected by the max function of Expression (2), and the risk-considered history generation unit 193 calculates the penalty to $(1/\varepsilon)(v+\Sigma_{t=0}^{Tm} -r_{t,m})$. The risk-considered history generation unit 193 calculates a value obtained by subtracting this penalty from the reward $r_{t,m}$, as the risk-considered reward $r'_{t,m}$.

In other words, when the cumulative reward for the m-th episode is less than v, a process of penalizing the final state in the m-episode (that is, process of subtracting the reward in the final state from the given reward) can be represented. With such a process, an effect that, in a process of creating a plurality of episodes, it is possible to reduce the possibility of selecting an operation of the state of the control target reaching the final state even when the possibility (or frequency) of the final state occurring is low is exhibited. That is, in the present example embodiment, the risk can correspond to a case where the cumulative reward for the m-th episode is less than v.

With Expression (2), it is possible to extract the risk from the interaction history information by introducing the threshold value v. Specifically, an episode in which the cumulative reward is less than the threshold value v can be regarded as the risk. The risk-considered history generation unit 193 gives the penalty to the reward in order to make it difficult for the planner parameter setting unit 192 to select the operation of such an episode when the planner parameter setting unit 192 determines the value of the planner parameter. The risk-considered history generation unit 193 gives the penalty to the reward in accordance with how much the cumulative reward falls below the threshold value v.

In Step S14 in FIG. 3, the planner parameter setting unit 192 updates the value of the planner parameter based on the risk-considered interaction history information. As a method in which the planner parameter setting unit 192 updates the value of the planner parameter based on the risk-considered interaction history information, a known method for generating an operation rule based on the reward can be used.

For example, the planner parameter setting unit 192 may update the value of the planner parameter by the policy gradient method using Expression (3).

$$\theta \leftarrow \alpha \left\{ \sum_{m=1}^{M} \sum_{t=1}^{T_m} r'_{t,m} \nabla_\theta \log \pi(a_{t,m} \mid s'_{t,m}, \theta) \right\} \quad (3)$$

Here, M indicates the number of episodes. $T_m$ indicates the number of turns in the m-th episode. $\alpha$ is a coefficient for adjusting the magnitude of updating the planner parameter $\theta$.

$\pi(a_{t,m}|s'_{t,m}, \theta)$ indicates the probability that the operation $a_{t,m}$ is selected based on the state $s'_{t,m}$ and the planner parameter $\theta$. $\nabla_\theta \log \pi(a_{t,m}|s'_{t,m}, \theta)$ indicates the derivative of $\log \pi(a_{t,m}|s'_{t,m}, \theta)$ by $\theta$. By changing the value of the planner parameter $\theta$ in a direction of the inclination indicated by $\nabla_\theta \log \pi(a_{t,m}|s'_{t,m}, \theta)$, the probability that the operation $a_{t,m}$ is selected based on the state $s'_{t,m}$ and the planner parameter $\theta$ increases.

When the value of the risk-considered reward r' is positive, the planner parameter setting unit 192 updates the value of the planner parameter $\theta$ in the direction of the inclination indicated by $\nabla_\theta \log \pi((a_{t,m}|s'_{t,m}, \theta)$. Thus, the probability that the operation $a_{t,m}$ is selected based on the state $s'_{t,m}$ and the planner parameter $\theta$ increases.

On the other hand, when the value of the risk-considered reward r' is negative, the planner parameter setting unit 192 changes the value of the planner parameter θ in an opposite direction of the direction of the inclination indicated by $\nabla_\theta \log \pi((a_{t,m}|s'_{t,m}, \theta)$. Thus, the probability that the planner unit 191 selects the operation $a_{t,m}$ based on the state $s'_{t,m}$ and the planner parameter θ decreases.

The planner parameter setting unit 192 updates the value of the planner parameter θ so as to maximize the cumulative value of the risk-considered reward r', by using Expression (3). As described above, the risk-considered history generation unit 193 subtracts the penalty from the reward of the episode including the risk, so that the probability that the operation of the episode including the risk is selected decreases.

Third Example Embodiment

In a third example embodiment, another more specific application example of the operation rule determination device 100 according to the first example embodiment will be described. The description of the first example embodiment is also applied to the third example embodiment. In particular, the configuration and operation of an operation rule determination device 100 in the third example embodiment are similar to the configuration and operation described with reference to FIGS. 1 to 3.

In the third example embodiment, an example in which the operation rule determination device 100 is used for controlling a plant will be described. The operation rule determination device 100 is applicable not only to the plant but also to various control targets to which reinforcement learning can be applied.

In the example in the third example embodiment, the parametric environment execution unit 194 is configured to include a simulator of the plant as the control target. The environment in the example in the third example embodiment is provided by the simulator.

A model of the simulator in the parametric environment execution unit 194 includes the outside air temperature around the plant in the parameter as an environment parameter. In the third example embodiment, the possible outside air temperature around the plant is used as the environment parameter set. The environment parameter selection unit 195, for example, performs sampling of the outside air temperature from the truncated normal distribution.

The interaction history information is generated by the combination of the planner unit 191 and the parametric environment execution unit 194, and is stored in the interaction history storage unit 182. The planner unit 191 determines the operation in accordance with the state. The parametric environment execution unit 194 sets the outside air temperature selected from the environment parameter set by the environment parameter selection unit 195, as the parameter of the simulator, and simulates the plant in accordance with the set parameter. The parametric environment execution unit 194 calculates the state of the control target after the operation by simulation. The planner unit 191 calculates the reward based on the state and the operation.

In the example in the third example embodiment, the parametric environment execution unit 194 calculates the simulation value of the value of a sensor installed in the plant, such as a pressure sensor and a flow rate sensor, as the state.

The planner unit 191 calculates a control command value for the plant as an operation, for example, a predetermined opening command value of a flow rate control valve. The planner unit 191 may calculate the control command value for the plant by the PID (Proportional Integral Differential) control value, but the present invention is not limited to this.

In The planner unit 191 calculates the reward in accordance with the amount of products calculated by the parametric environment execution unit 194 in the plant simulation, such as the amount of ethylene or the amount of gasoline.

Figure 11:
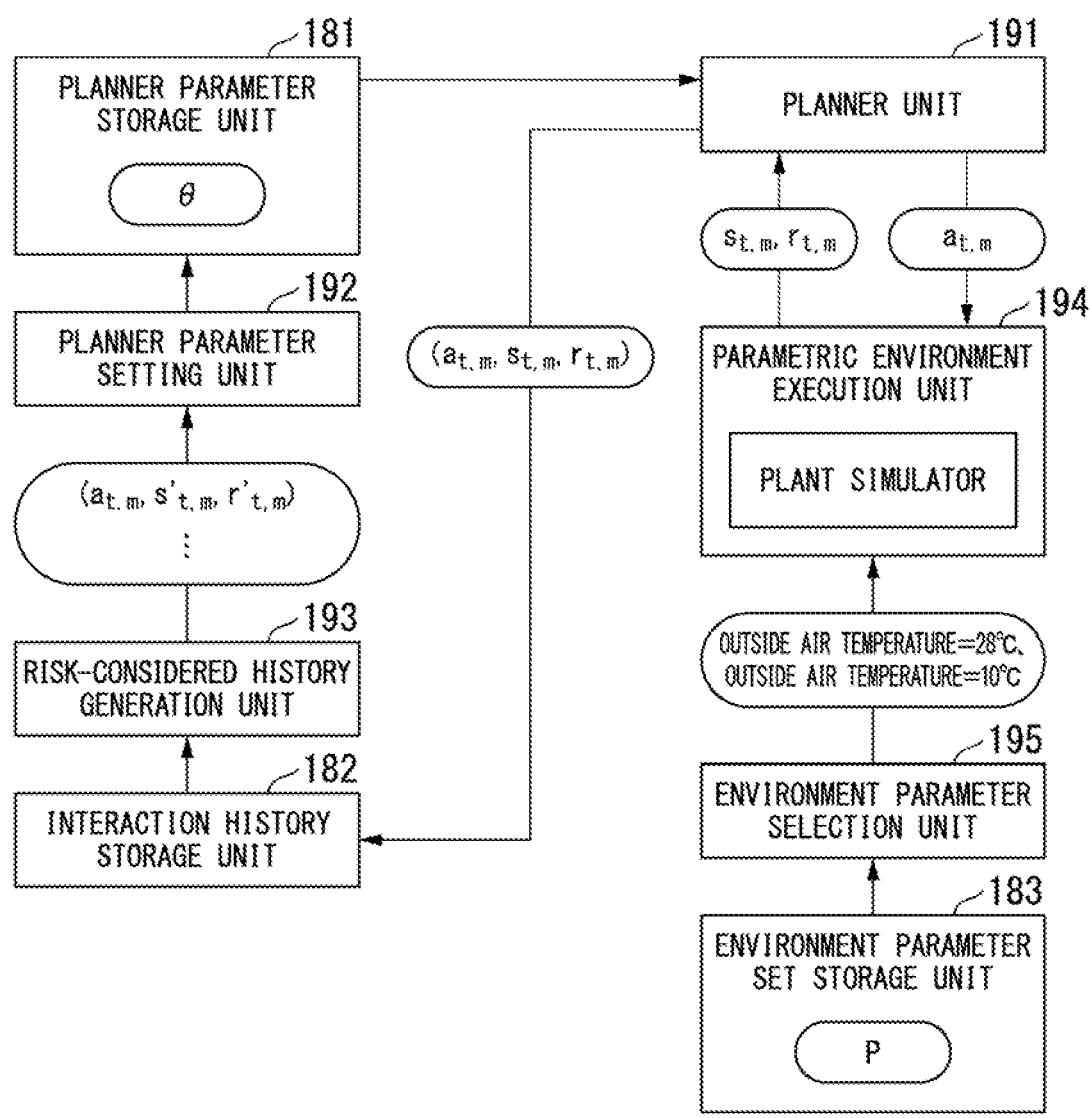
FIG. 11 is a diagram showing a data flow in an operation rule determination device according to a third example embodiment.

FIG. 11 is a diagram showing a data flow in the operation rule determination device 100 according to the third example embodiment. FIG. 11 is different from FIG. 2 in that 28° C. and 10° C. are shown as the values of the environment parameters selected by the environment parameter selection unit 195, and the parametric environment execution unit 194 is configured to include a plant simulator. For others, FIG. 11 is similar to FIG. 2.

The parametric environment execution unit 194 executes an episode for each of the outside air temperature=28° C. and 10° C. selected by the environment parameter selection unit 195.

As described above, the operation rule determination device 100 can calculate the control command value considering the risk of the outside air temperature by determining the operation rule considering the risk in the setting of the possible outside air temperature.

Thus, in a situation where it is not possible to measure the outside air temperature because the actual plant is not provided with an outside air temperature sensor, the operation rule determination device 100 can present, to a plant operator, a control plan of the plant considering the risk caused by the uncertainty of the outside air temperature.

Alternatively, the operation rule determination device 100 may determine the operation rule in addition to or instead of the outside air temperature, by using possible facility failure as the environment parameter. Thus, the operation rule determination device 100 can present, to the plant operator, the plant control so that the disadvantage in a case where facility failure has occurred is relatively small.

Alternatively, the operation rule determination device 100 may determine the operation rule by using a possible natural disaster as the environment parameter. Thus, the operation rule determination device 100 can present, to the plant operator, the plant control so that the disadvantage in a case where a natural disaster has occurred is relatively small.

Fourth Example Embodiment

Figure 12:
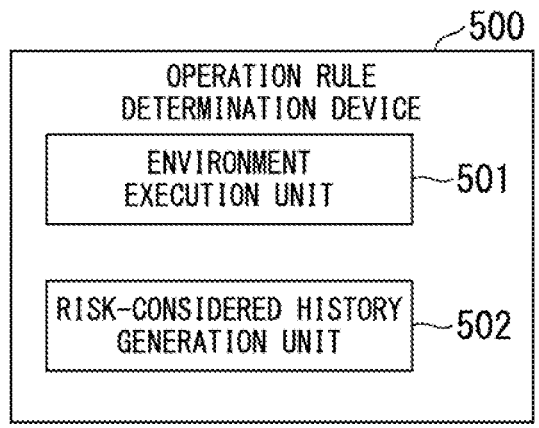
FIG. 12 is a diagram showing an example of a configuration of an operation rule determination device according to a fourth example embodiment.

FIG. 12 is a diagram showing an example of a configuration of an operation rule determination device according to a fourth example embodiment. With the configuration represented in FIG. 12, an operation rule determination device 500 includes an environment execution unit 501 and a risk-considered history generation unit 502.

With such a configuration, the environment execution unit 501 obtains the state of the control target after each operation and the degree associated with the state for a series of operations on the control target, by using degree information in which the state and the degree of desirability of the state are associated with each other. The risk-considered history generation unit 502 calculates the cumulative degree obtained by accumulating the obtained degree for the series of operations. When the cumulative degree satisfies a condition, the risk-considered history generation unit reduces the degree associated with the state after the series of operations in the degree information.

According to the operation rule determination device 500, the operation rule considering the risk can be obtained by determining the operation rule by using the risk-considered interaction history information in which the risk is applied. Thus, the planner which determines the operation according to the state can determine the operation considering the risk.

Fifth Example Embodiment

Figure 13:
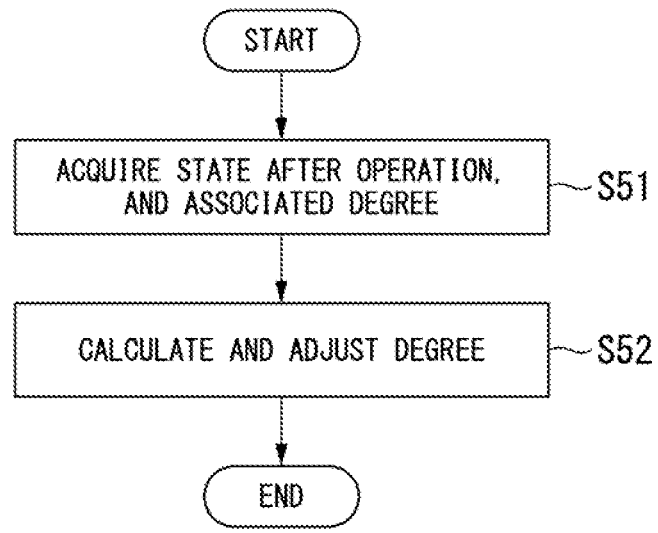
FIG. 13 is a diagram showing an example of a process procedure in an operation rule determination method according to a fifth example embodiment.

FIG. 13 is a diagram showing an example of a process procedure in an operation rule determination method according to a fifth example embodiment. The operation rule determination method represented in FIG. 13 includes Steps S51 and S52. In Step S51, a computer obtains the state of a control target after each operation and a degree associated with the state for a series of operations on the control target, by using degree information in which the state and the degree of desirability of the state are associated with each other. In Step S52, the computer calculates a cumulative degree obtained by accumulating the obtained degree for the series of operations. When the cumulative degree satisfies a condition, the computer reduces the degree associated with the state after the series of operations in the degree information. In Step S53, the operation to be performed on the control target is determined by using the operation rule in which the value of the planner parameter determined by the parameter setting unit is set.

According to the operation rule determination method, the operation rule considering the risk can be obtained by determining the operation rule by using the risk-considered interaction history information in which the risk is applied. Thus, the planner which determines the operation according to the state can determine the operation considering the risk.

Figure 14:
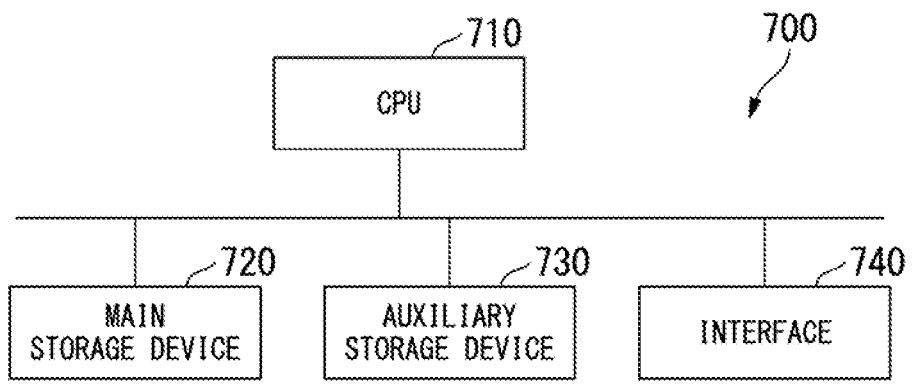
FIG. 14 is a schematic block diagram showing a configuration of a computer according to at least one example embodiment.

FIG. 14 is a schematic block diagram showing a configuration of a computer according to at least one example embodiment.

In the configuration represented in FIG. 14, a computer 700 includes a CPU 710, a main storage device 720, an auxiliary storage device 730, and an interface 740.

Any one or more of the operation rule determination device 100 and the operation rule determination device 500 described above may be mounted on the computer 700. In this case, the operation of each of the above-described processing units is stored in the auxiliary storage device 730 in the form of a program. The CPU 710 reads the program from the auxiliary storage device 730, loads the program to the main storage device 720, and executes the above processes in accordance with the program. The CPU 710 secures a storage area corresponding to each of the above-described storage units in the main storage device 720, in accordance with the program. Communication between each device and another device is performed in a manner that the interface 740 has a communication function and performs communication in accordance with the control of the CPU 710.

When the operation rule determination device 100 is mounted on the computer 700, the operations of the control unit 190 and the units thereof are stored in the auxiliary storage device 730 in the form of a program. The CPU 710 reads the program from the auxiliary storage device 730, loads the program to the main storage device 720, and executes the above processes in accordance with the program.

The CPU 710 secures a storage area corresponding to the storage unit 180 in the main storage device 720, in accordance with the program. The communication performed by the communication unit 110 is performed in a manner that the interface 740 has a communication function and performs communication in accordance with the control of the CPU 710.

When the operation rule determination device 500 is mounted on the computer 700, the operations of the environment execution unit 501 and the risk-considered history generation unit 502 are stored in the auxiliary storage device 730 in the form of a program. The CPU 710 reads the program from the auxiliary storage device 730, loads the program to the main storage device 720, and executes the above processes in accordance with the program.

A program for realizing all or some of the functions of the operation rule determination device 100 or the operation rule determination device 500 may be recorded on a computer-readable recording medium, and the program recorded on the recording medium may be read on a computer system and executed. In this manner, the processes of the units may be executed. The "computer system" here includes hardware such as an OS (operating system) and peripheral devices.

The "computer-readable recording medium" includes a portable medium such as a flexible disk, a magneto-optical disk, a ROM (Read Only Memory), and a CD-ROM (Compact Disc Read Only Memory), and a storage device such as a hard disk, which are mounted in the computer system. The above-described program may be a program for realizing some of the above-described functions, and may be a program for realizing the above-described functions in combination with a program already recorded in the computer system.

Hereinbefore, the example embodiments of the present invention have been described in detail with the accompanying drawings, but specific configurations are not limited to these example embodiments, and also include a change in design and the like without departing from the scope of the present invention.

INDUSTRIAL APPLICABILITY

The example embodiments of the present invention may be applied to an operation rule determination device, an operation rule determination method, and a recording medium.

REFERENCE SYMBOLS 100, 500: Operation rule determination device
110: Communication unit
180: Storage unit
181: Planner parameter storage unit
182: Interaction history storage unit
183: Environment parameter set storage unit
190: Control unit
191: Planner unit
192: Planner parameter setting unit
193, 502: Risk-considered history generation unit
194: Parametric environment execution unit
195: Environment parameter selection unit
501: Environment execution unit

What is claimed is:
1. An operation rule determination device comprising:
at least one memory storing instructions; and
at least one processor configured to execute the instructions to:
obtain a state of a control target after each operation and a reward associated with the state for a series of operations on the control target, by using reward information associating the state with the reward corresponding to the state;

calculate a cumulative reward obtained by accumulating the obtained reward for the series of operations;

when the cumulative degree satisfies a condition, reduce the reward associated with the state after the series of operations in the reward information;

calculate the cumulative reward for a plurality of the series of operations;

obtain a frequency of the cumulative reward calculated for the plurality of the series of operations; and determine the condition using the obtained frequency.

2. The operation rule determination device according to claim 1, wherein the at least one processor is configured to execute the instructions to update a parameter value indicating the operation of the control target so that the cumulative reward increases.

3. The operation rule determination device according to claim 2, wherein the at least one processor is configured to control the control target in accordance with the parameter value.

4. The operation rule determination device according to claim 2, wherein the at least one processor is configured to simulate the operation of the control target based on the parameter value.

5. The operation rule determination device according to claim 1, wherein the at least one processor is configured to subtract an amount corresponding to the cumulative reward from the reward in the reward information.

6. An operation rule determination method comprising:

by a computer, obtaining a state of a control target after each operation and a reward associated with the state for a series of operations on the control target, by using reward information associating the state with the reward corresponding to the state;

by the computer, calculating a cumulative reward obtained by accumulating the obtained reward for the series of operations;

by the computer, when the cumulative degree satisfies a condition, reducing the reward associated with the state after the series of operations in the reward information;

by the computer, calculating the cumulative reward for a plurality of the series of operations;

by the computer, obtaining a frequency of the cumulative reward calculated for the plurality of the series of operations; and by the computer, determining the condition using the obtained frequency.

7. A non-transitory recording medium storing a program causing a computer to execute a process comprising:

obtaining a state of a control target after each operation and a reward associated with the state for a series of operations on the control target, by using reward information associating the state with the reward corresponding to the state;

calculating a cumulative reward obtained by accumulating the obtained reward for the series of operations;

when the cumulative degree satisfies a condition, reducing the reward associated with the state after the series of operations in the reward information calculating the cumulative reward for a plurality of the series of operations;

obtaining a frequency of the cumulative reward calculated for the plurality of the series of operations; and determining the condition using the obtained frequency.

* * * * *